United States Patent [19]

Wellinghoff et al.

[11] Patent Number: 4,801,411

[45] Date of Patent: Jan. 31, 1989

[54] METHOD AND APPARATUS FOR PRODUCING MONOSIZE CERAMIC PARTICLES

[75] Inventors: Stephen T. Wellinghoff, San Antonio; Thomas E. Owen, Helotes, both of Tex.

[73] Assignee: Southwest Research Institute, San Antonio, Tex.

[21] Appl. No.: 871,093

[22] Filed: Jun. 5, 1986

[51] Int. Cl.$^4$ .............................................. B29B 9/10
[52] U.S. Cl. ........................................ 264/7; 239/3; 264/9; 264/10; 264/13; 264/24
[58] Field of Search ............... 264/5, 7, 10, 9, 82, 264/22, 23, 24, 13; 209/8, 214, 215, 127.1, 128, 129, 130; 239/3, 8, 13

[56] References Cited

U.S. PATENT DOCUMENTS

| | | | |
|---|---|---|---|
| 3,244,279 | 4/1966 | Butler | 209/128 |
| 3,380,584 | 4/1968 | Fulwyler | 209/127.1 |
| 3,411,715 | 11/1968 | Wallis | 239/3 |
| 3,993,246 | 11/1976 | Erb et al. | 239/8 |
| 4,133,854 | 1/1979 | Hendricks | 264/10 |
| 4,162,282 | 7/1979 | Fulwyler et al. | 264/9 |
| 4,245,784 | 1/1981 | Garcin | 239/3 |
| 4,284,496 | 8/1981 | Newton | 209/3.3 |
| 4,557,828 | 12/1985 | Dittrich | 209/214 |
| 4,621,268 | 11/1986 | Keeling et al. | 239/3 X |
| 4,628,040 | 12/1986 | Green et al. | 502/9 |

Primary Examiner—Jan H. Silbaugh
Assistant Examiner—Marylynn Fertig
Attorney, Agent, or Firm—Thomas E. Sisson

[57] ABSTRACT

A method and apparatus for producing uniform, monosize ceramic particles forming the microsize particles by vapor condensation or ultrasonic cavitation. Organometallic liquids are directed to an aerosol generator where a droplet stream is projected in free flight within a reaction chamber and a particle sorter. Through the process of sorting the droplets according to their velocity in flight, monosize droplets are collected. The particles may be reacted prior to or after sorting and collection to form the monosize ceramic particle of interest. Sintering aids are introduced into the process to produce ceramic particles capable of improved green body formation.

1 Claim, 4 Drawing Sheets

METHOD AND APPARATUS FOR PRODUCING MONOSIZE CERAMIC PARTICLES

BACKGROUND OF THE INVENTION

This invention relates to a method and apparatus for producing monosize ceramic particles from organometallic liquid precursors in a continuous process.

A number of batch chemical methods and modifications thereto are currently used to produce high density ceramic refractory bodies (green bodies) for a multiplicity of industrial applications. Major emphasis has been placed on producing maximum refractory strength via monodisperse ceramic particles. Most of these batch processes are lengthy and costly.

The usual method of preparing a fine-particle oxide salts from oxalates, acetates, and carbonates is to thermally decompose, pyrolyze, or hydrolyze them to their oxides. Current results obtained using the controlled hydrolysis method are the most successful to date in producing accurately sized particles having spheroidal shape and a diameter of approximately 200 nanometers with low agglomeration of particles.

Size dispersion of particles no better than ±10 percent can be produced by either: (1) precipitation of supersaturated solutions of an appropriate water reactive metal alkoxide or (2) preparation of a monodisperse aerosol by condensation of a supersaturated atmosphere of organometallic vapor in a flowing inert gas stream. Upon dispersal in water to form a colloidal suspension, only disordered colloids, which have a tendency to aggregate upon removal of the suspending solvent phase during slip casting, will be present. These powders still exhibit sufficient agglomeration to induce occasional preferential sintering defects in the finished microstructure of the ceramic, resulting in local variations in density and potential stress concentration failure centers.

Further, many of today's newest and most promising ceramics such as silicon nitride are not processible by controlled hydrolysis of alkoxide solutions. For these ceramics, other methods of particle formation are required.

Experimental and theoretical evidence has shown that the size uniformity must be less than ±1 percent to promulgate ordered suspensions in which the particles pack into a close-packed hexagonal or face-centered cubic array of a wide range of particle volume fractions, $\phi$, which may be as low as $\phi = 10$ percent. Defect-free sintering should be much more probable from a green body with an ordered particle arrangement.

The method of the present invention is effective largely because the organometallic compounds are liquid solutions in which controlled hydrolysis produces uniform microsized particle precipitation. Alternative mechanization of the alkoxide hydrolysis reaction and precipitation process, using aerosolparticle formation and flow stream processing, provide a high degree of particle handling thereby avoiding agglomeration. Production of the organometallic precursor liquids as uniform size aerosol droplets and subsequent electrostatic charging and electromagnetic separation of these particles assures high uniform size and lack of agglomeration during subsequent reaction to form the finished molding powder. Dispersal and coating of sintering aids and grain growth limiting agents on the surface of the ceramic precursor particle during flow stream processing results in the production of truly single size particles in a continuous process.

The method of the present invention produces monosize ceramic precursor particles in free flight, one separated from another. The precursor particles are processed to a sinterable ceramic in flight. The ceramic precursor particle is uniformly coated with the sintering aid and grain limiting substances at the precursor stage. The process employs CVD (chemical vapor deposition) of the sintering aid during flight of the already formed ceramic particle.

SUMMARY OF THE INVENTION

Organometallic liquid precursors to ceramics are directed to an aerosol generating device to form a stream of individual organometallic precursor particles or droplets of relatively narrow size distribution. The liquid aerosol droplets are electrostatically charged to aid in their segregation during the particle stream flow into a reaction chamber where they are chemically processed. The organometallic precursor particles enter a reaction chamber where they are hydrolyzed in free flight in a moist inert gas to form oxide particles. The heated, oxide particles continue in free flight and pass through a chemical vapor deposition zone wherein the particles are coated with a sintering aid. These coated particles then are charged by a corona and separated in particle size by passing through electric and magnetic fields in a velocity sorter which separates the particles by trajectory according to their charge-to-mass ratio. The separated, coated, and charged monosized particles are collected further by electrostatic precipitation. Alternatively, the organometallic droplets may be charged, separated as above, and then subsequently reacted with water vapor, heated, and collected.

DETAILED DESCRIPTION OF THE INVENTION

The process or method of the present invention involves a series of steps which can be generally stated as the organometallic liquid precursor preparation step, the particle generation and separation step, the in-flight particle processing step, and the particle sorting and collection step.

Organometallic Liquid Precursors

Figure 1:
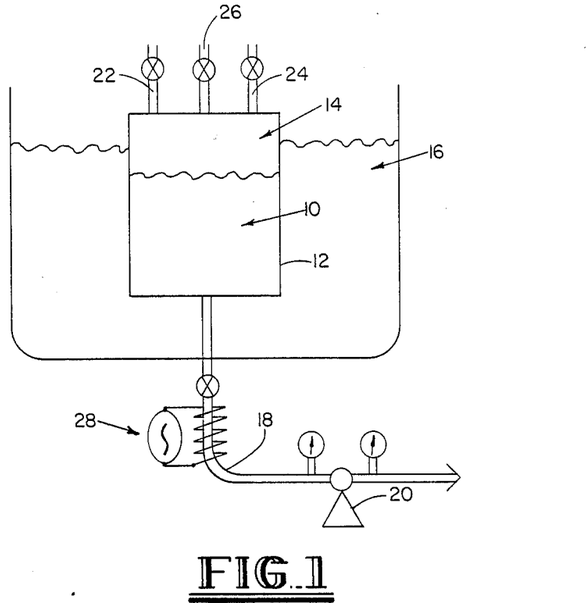
FIG. 1 is a flow diagram of the liquid distribution system of the invention.

FIG. 1 illustrates the liquid feed stream of organometallic liquid 10 which is directed to an appropriate particle generator. The organometallic liquid may be of the formula $MR_n$ wherein M is metal atom, R is an alkyl, alkoxy, or aryloxy group, and n is a whole integer from 1 to 8. Metals which can comprise the metal constituent of the compounds to be employed in this invention are, in general, any metals of Groups II-A through V-A of the Periodic Chart of the Elements. However, metal compounds containing the following metals are preferred: beryllium, titanium, zirconium, niobium, tantalum, chromium, molybdenum, tungsten, cobalt, nickel, copper, zinc, cadmium, aluminum, tin, and lead. Zirconium, tantalum, aluminum, and yttrium are especially preferred.

Alkoxides which can comprise the organic constituent of the compound to be employed in this invention are, in general, branched and linear alkoxides with up to 10 carbon atoms. However, isopropoxides are preferred. As an example, the alkoxide zirconium isopropoxide, $Zr(O\text{-}isoC_3H_7)_4$, is utilized and is especially useful because of its commercial availability.

The liquid organometallic compound, 10, is placed in a controlled atmosphere chamber 12 with a water-free inert gas head 14. Chamber 12 is capable of being heated in a constant temperature bath 16 and pumped via conduit 18 by a metering pump 20 to the appropriate particle generator. Chamber 12 is equipped with vent 22 and vacuum line 24. Liquid 10 is fed to chamber 12 via inlet line 26. To insure proper transfer temperature control, conduit 18 is provided with a heated train line 28.

The instant method is also intended to produce monosize particles which are coated with sintering aid to facilitate the ultimate production of highly uniform, void-free green bodies in the overall ceramic process. As will be discussed below in greater detail, one method of coating involves the step of chemical vapor deposition of the sintering aid after the hydrolysis of the monosize organometallic particle.

Alternatively, it may be beneficial to deliver to the particle generator two separated organometallic liquid precursors. This is especially valuable where the generator is the ultrasonic type, as will be discussed in further detail below. In order for two liquids to remain unmixed or immiscible, their surface tensions must be sufficiently different. An example of such a two-component fluid would be perfluoroalkoxides of tantalum mixed with alkoxides of zirconium. One such perfluoroalkoxide of tantalum is tantalum penta (heptafluoroisopropoxide), Ta $(\text{—}OC_3F_7)_5$. One such example of an alkoxide of zirconium would be zirconium tetraisopropoxide, Zr $(\text{—}OC_3H_7)_4$.

The tendency of such a system will be to phase separate with the lower surface energy lower density, perfluorophase facing the gas interface. In the process of the invention, such a two-component organometallic fluid is directed to an aerosol particle generator.

Aerosol Particle Production and Suspension

One of the first steps in producing monosize particles which can be subjected to chemical processing in suspension is to generate the particles of organometallic liquid in aerosol form. These aerosol particles must be composed of the precursory chemical reactant substances and must have a size such that, when the chemical reaction is complete, the residual product is a monosize particle having a preferred small size (typically less than one micrometer) and having a preferred narrow range of size distribution (typical standard deviation in size of $\pm 10$ percent). The monosize organometallic liquid aerosol particles, also referred to as droplets, must then be moved and distributed into a reaction chamber where they are subjected to heating and/or hydrolysis to cause the chemical reaction process of interest. While in this reaction chamber, the droplets must not coagulate or agglomerate to form larger particle sizes.

Herein disclosed are two methods by which such chemical reactant substances are combined or otherwise formed into small organometallic liquid aerosol droplets and which, by means of unipolar electrostatic charging, are caused to remain in a monosize particle suspension in free flight during the chemical reaction time. Each of these methods has certain advantages in the manner by which two (or possibly more) chemical substances may be initially formed into liquid droplets, in the control of the early stages of chemical reaction, and in the range of droplet sizes generated.

The first of these methods creates organometallic liquid droplets by a process of vapor condensation to yield exceptionally small droplet sizes. For example, two chemical substances in vapor form may be combined abruptly as a small condensed liquid droplet so that any chemical reaction can only begin after the droplet is formed.

The second method creates liquid droplets by mechanical disruption of a bulk source of liquid in which certain chemical reactions may already be in progress. In this case, the generated droplets may require less residence time in the reaction chamber or may otherwise be subjected to other intended reaction conditions after being formed into monosize droplets. Both methods employ unipolar electrostatic charging of the generated droplets for the purpose of minimizing the collision and coagulation of the suspended particles.

Vapor Condensation Aerosol Generation

The first method of generating organometallic precursor droplets is through vapor condensation aerosol generation. By way of preliminary explanation, atomizing techniques are used in many practical applications to generate small liquid droplets in the form of sprays and fogs by which the source liquid may be distributed for useful purposes. Such aerosol particles are generated by rapidly expanding the source liquid through a small nozzle driven by a compatible pressurized carrier gas. The size of the aerosol particles generated by this method are governed by the nozzle orifice size and flow characteristics and the carrier gas operating pressure. The particles generated by this method are generally not small in comparison with the droplet sizes of interest in this invention; their diameters ranging from about 20 micrometers upward. Electrostatic charging of the generated particles is an intrinsic effect associated with the disruption of the larger droplets which are the source of the final aerosol particles. In many applications, for example spray painting, intentionally applied charging of the aerosol particles aids in the production of smaller diameter particles and in disbursing the particles with minimum coagulation and, finally, in collecting the particles on the work piece in a uniform and efficient manner.

The atomization concepts described above may be extended to apply to the generation of extremely small particles if the process is reversed from one of disruption of larger liquid droplets to one of preferential vapor condensation to droplet form. The intentional application of electrostatic charging may be used to advantage in this process by providing charged ion nucleation centers at which the vapor condensation occurs. Chemical reaction processing may be incorporated by combining appropriate source and reagent vapors at the droplet condensation centers (one vapor species used as the charged nucleation center on which the other vapor condenses). This vapor condensation process offers the most favorable approach to forming the smallest practical droplet size.

Figure 2:
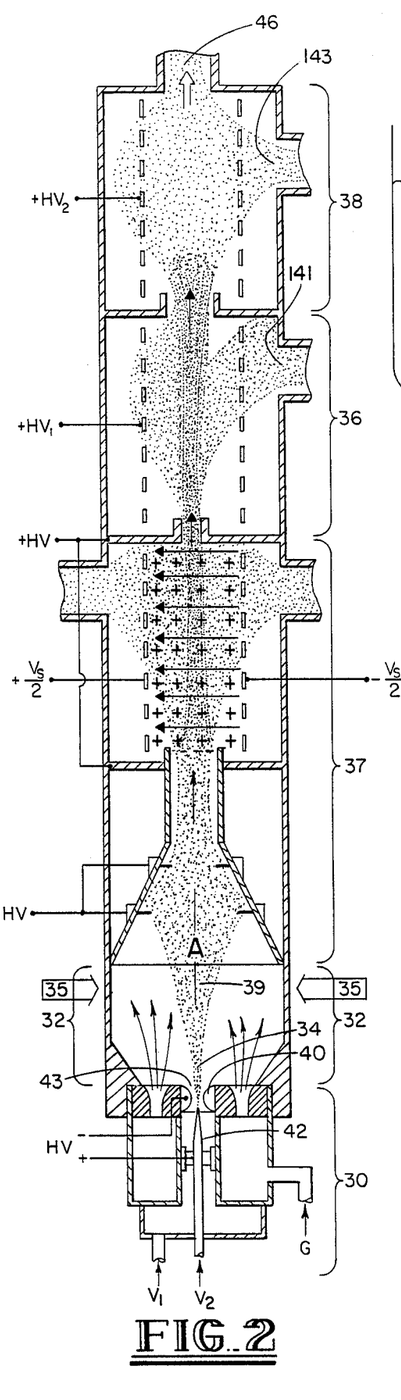
FIG. 2 is a diagrammatic vertical sectional view of the vapor condensation embodiment of an apparatus constructed in accordance with the present invention.

In FIG. 2 it can be seen that liquid 10 which has been vaporized to vapor, $V_1$, passes through a particle generator 30. Vapor $V_1$ is condensed to yield exceptionally small droplet sizes. These droplets carry a unipolar electrostatic charge and pass into a heated controlled environment chamber 32 for pyrolysis to occur. With zirconium isopropoxide droplets the pyrolysis occurs according to the following equation:

$$Zr(O-iso\ C_3H_7)_4 \xrightarrow[\text{inert gas}]{\Delta} ZrO_2 + \text{alkene} + \text{alcohol}.$$

By controlling the mixing ratio of the condensing vapors, each droplet formed by the aerosol generator serves as a chemical reaction site at which, within the reaction chamber, the purified ceramic particle is precipitated, the volatile reactants are evaporated, and residual unipolar electrostatic charge aids in maintaining each particle separated from similar particles which might otherwise tend to agglomerate.

Figure 3:
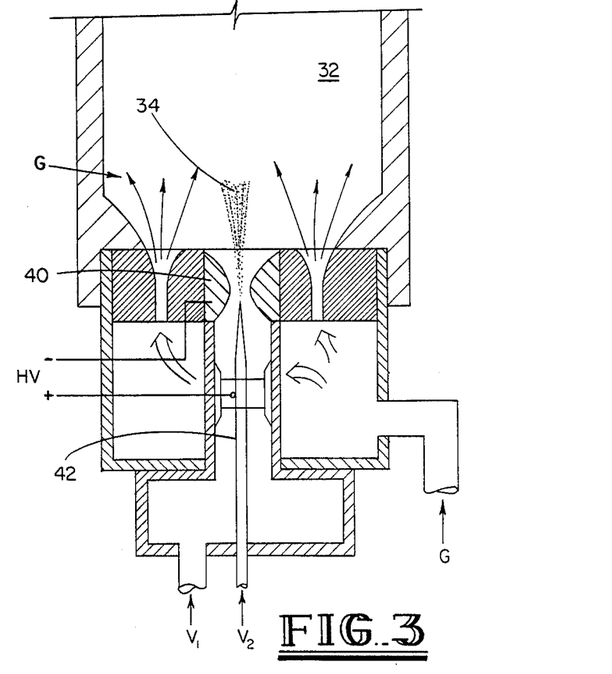
FIG. 3 is a cross-sectional view of one embodiment of the vapor condensation particle generator constructed in accordance with the present invention.

FIG. 2 shows the general arrangement of the vapor condensation aerosol particle generator 30, the reaction chamber 32, the particle sorting stage 37, and the particle collection stages 36, 38. The principal component of the aerosol particle generator 30 is the small-bore nozzle 40 through which vapor $V_1$, mixed with an inert carrier gas G, is expanded adiabatically at supersonic velocity to promote condensation. A more detailed illustration of this nozzle arrangement and related components is presented in FIG. 3. The nozzle 40 also serves as an electrode by which, together with a second needle-like high-voltage electrode 42 in the throat of the nozzle 40, a high-field corona discharge is established in the flow expansion zone 43 to form charged gaseous ions on which vapor, $V_1$, condenses as it exits the nozzle. The needle-like electrode 42 shown in FIG. 3, is, in one embodiment of this invention, a smaller coaxial nozzle through which vapor, $V_2$, is ejected to produce charged-ion nucleation centers on which vapor, $V_1$, will tend to condense.

Referring again to FIG. 2, a dry inert gas, G, is injected around the central aerosol nozzle 40 to disperse the condensed droplets 34 in the reaction chamber 32 to allow the chemical constituents of the droplets 34 to react with the aid of externally applied infrared heat 35 or to hydrolyze with $H_2O$ in gas G. Volatile components from the droplet reactions evaporate in the reaction chamber 32 to form a moving mixture of suspended charged submicrometer ceramic particles 39 and various vapor and carrier gas molecules. Above the reaction chamber 32 is a particle sorting stage 37 and a two-stage electrostatic precipitator 36 and 38 which serves to collect, first, the high-mobility gaseous ions 141 in the first stage and, second, the lower mobility ceramic particles 143 with a size variation of approximately ±1.0 percent. Any neutral particles or gases 46 flow through the precipitator to be recovered.

The supersonic nozzle vapor condensation process described above has been previously employed to condense humid air (corresponding to vapor $V_1$ in FIG. 2) into small water droplets for purposes unrelated to promoting chemical reactions in monodispersed aerosol suspensions. Whewell and Makin detail this work in their study, "A Study Of Charged Condensation Droplets From An Aircraft Discharger" (Proc. Third Conf. on Static Electrification, The Inst. of Phys., Conf. Series II, Paper No. 23, pp 270–281, May 1971) which is incorporated herein by reference. The design and operating conditions of this earlier supersonic nozzle device were:

Nozzle Throat Diameter: 2.3 mm
Operating Pressure (Vapor $V_1$): 860 kPa
Flow Velocity in Nozzle Throat: Mach 2
High Voltage Applied to Nozzle: 5–10 microamp
Water Droplet Size at Exit: 2.5 nanometers.

A similar vapor condensation water aerosol generator was also used for the purpose of applying electrostatically charged particles onto aircraft surfaces. This is outlined in J. Taillet's, "Method Of Assessment Of The Antistatic Protection Of Aircraft," (Proc. Fifth Conf. on Electrostatic Phenomena, The Inst. Of Phys. Conf., Series 48, pp 125–133, Apr. 1979) which is incorporated herein by reference. The design and operating conditions of this second device were essentially the same as those listed above.

Ultrasonic Aerosol Generation

Another method for producing the organometallic precursor droplets is by means of ultrasonic excitation of precursor liquid solution. Cavitation in liquids caused by high-intensity ultrasonic energy can cause aerosol droplets to be ejected from the liquid surface to become suspended in the surrounding atmosphere. This technique has been used previously to generate liquid droplets in the size range of 1–3 micrometers for applications where a high-density aerosol source is required. M. B. Denton and D. B. Schwartz's article "An Improved Ultrasonic Nebulizer System For The Generation of High Density Aerosol Dispersion," (Rev. Sci. Inst., Vol. 45, pp 81–83, January 1974) details this work and is incorporated herein by reference. For this particle size range, the ultrasonic operating frequency was 3 MHz and the driving power required to produce appropriate liquid cavitation was approximately 100 watts. The dilution of the organometallic compounds (alkoxides) mentioned earlier in an anhydrous solvent such as ethanol will result in droplets which, upon evaporation of the solvent after particle generation, will produce a final particle size whose diameter is reduced from the original aerosol particle diameter by the cube root of the volume concentration of the alkoxide diluent. Thus, for example, by using a source solution whose solid precipitate components are diluted in the 100:1 to 1000:1 range by the volatile solvent, the resulting solid particles will be in the size range of one-fifth to one-tenth that originally produced in the cavitation-generated liquid aerosol droplets.

The initial size of such ultrasonically-generated aerosol particles can be reduced by applying higher frequency ultrasonic energy in the cavitation process whereby the particle diameter is approximately inversely proportional to the ultrasonic frequency. However, because higher ultrasonic energy density is required for cavitation at higher frequencies and the piezoceramic elements required for high frequency operation are proportionately smaller and less capable of handling higher operating power, there is a practical limit in the use of higher operating frequencies to produce the required liquid cavitation effects. This upper frequency limit is estimated to be about 10 MHz in deaerated water.

By preconditioning the organometallic liquid to contain a dissolved gas or to contain very small inert gas bubbles (aeration), or by reducing the hydrostatic pressure of the liquid during processing, the threshold ultrasonic energy required to produce cavitation in the liquid is significantly reduced. With regard to the effectiveness of these cavitation enhancement techniques, aeration of the liquid is the most effective expedient to promoting cavitation. However, since the benefit of aeration is derived from the size of the aerating gas bubbles relative to the ultrasonic wavelength, the improvement diminishes at frequencies above about 200-300 kHz because of the diminished abundance of appropriately small bubbles. At frequencies below this limit, however, the ultrasonic energy required for cavitation can be reduced by about an order of magnitude in aerated liquids depending upon the liquid involved.

Elevating the liquid temperature provides a useful reduction in cavitation energy threshold, particularly as the temperature approaches the liquid boiling point. As an example, in water at 80° C. and atmospheric pressure, the cavitation threshold is reduced by about a factor of 2.5 over that at room temperature. Reducing the ambient pressure of the liquid has a similar benefit. For example, for water at a pressure of 2.5 psi and a temperature of 40° C., a reduction in cavitation threshold of about a factor of 2.6 is achieved over that at atmospheric pressure.

Figure 4:
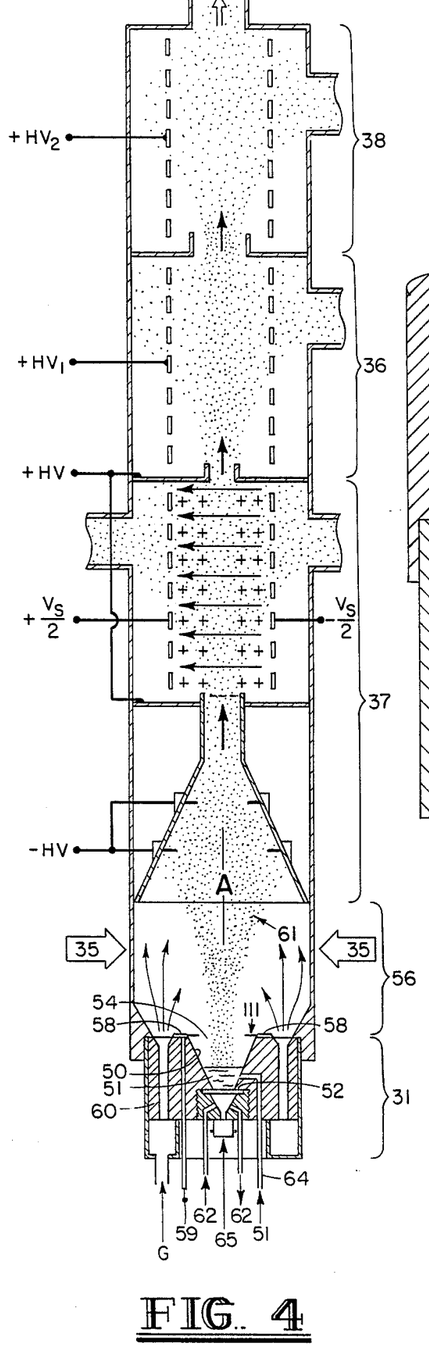
FIG. 4 is a diagrammatic verticle sectional view of the ultrasonic aerosol generating embodiment of an apparatus constructed in accordance with the present invention.

FIG. 4 illustrates the aerosol generating method using an aerosol droplet generator 31 in which high-frequency ultrasonic cavitation is used to produce mono-size precursor particles. The cavitation reservoir 50 is supplied with a source organometallic liquid 51, to be converted into an aerosol suspension of liquid droplets 54. Ultrasonic excitation by the piezoceramic element 52 causes cavitation and a rising stream of small liquid droplets 54 to enter the reaction chamber 56. As these aerosol droplets 54 progress upward, a surrounding ring of electrostatic corona discharge electrodes 58 connected to high voltage source 59 imparts a unipolar charge onto the particles. Although the cavitation process intrinsically generates electrostatic charging effects on the droplets 54, the intentional charging process will serve to standardize the charge carried by each particle.

A dry inert gas, G, is introduced from a manifold 60 surrounding the particle stream to dilute the droplets 54 and distribute them within the reaction chamber 56. In the reaction chamber 56 the aerosol droplets 54, typically in the one micrometer diameter range, undergo solvent evaporation and chemical reaction to yield monosized particles 61 of interest.

Figure 5:
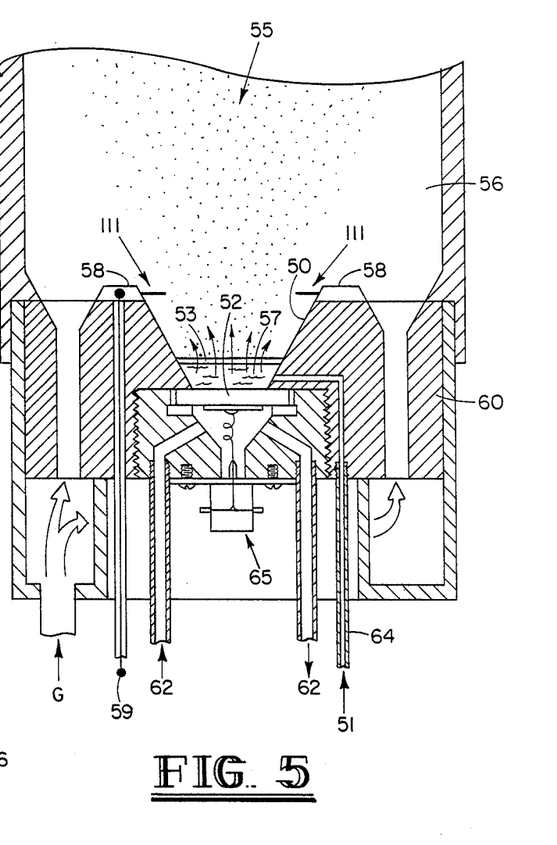
FIG. 5 is a cross-sectional view of one embodiment of the ultrasonic aerosol generator constructed in accordance with the present invention.

The design arrangment illustrated in FIGS. 4 and 5 shows the details of the liquid cavitation reservoir 50 and the mounting of the piezoceramic element 58 used to create the cavitation effect. In this arrangement, the piezoceramic element 52 is a thin circular disk having a diameter of about 2 cm and a thickness in the range of 0.5 mm to 1 mm so as to exhibit a fundamental mechanical resonance frequency in the range of 1 MHz to 2 MHz. For operation at higher frequencies, this element may be excited at any of its mechanical vibration overtones in the frequency range up to about 10 MHz. Other elements having a slightly different fundamental resonance frequency can be substituted to provide more complete coverage of the operating frequency range.

The piezoceramic element 52 is mounted to form the bottom of the cavitation liquid reservoir 50 and, because of the high-power excitation applied to this element 52 via excitation connector 65, it is liquid cooled on its back side with liquid coolant 62 such as silicone oil. A small liquid supply duct 64 provides replenishment of the organometallic liquid reservoir during the aerosol generation process.

In operation, the cavitation effect in the liquid 51 is driven at a sufficient power level to produce a large-area release of aerosol particles 54 at the liquid surface. The particles 54 are then subjected to an electrostatic corona discharge 58 which imparts a generally uniform unipolar charge to the droplets 54 for the purpose of causing them to remain in a monodispersed condition in the reaction chamber 56. The particles 54 are entrained by a dry inert gas, G, which disperses the aerosol particles 54 in the reaction chamber 56 where they remain temporarily to be subjected to heat to promote solvent evaporation and chemical reactions. Alternately, as discussed in detail below, the changed droplets 54 are first passed through a particle or droplet sorter and then through a reaction chamber.

In the case of the alkoxide hydrolysis reactions of typical interest, the reaction may be initiated to advantage in the source liquid supply and the solution then supplied to the ultrasonic cavitation reservoir for further reaction during cavitation and in droplet form within the reaction chamber. In this way small initially precipitated particles in the liquid within the cavitation reservoir tend to serve as cavitation bubble formation centers to be individually transported away as part of the aerosol droplet produced as a result of the collapsing cavitation bubbles.

In the case where the dispersing gas (or vapor), G, is also used as a chemical reactant in the reaction chamber 32 (FIG. 2) or 56 (FIG. 4), the concentrations of its chemical components are adjusted to match the intended chemical reaction proportions when weighted by the vapor combining rate with the suspended aerosol particles 54 or 34 in the reaction chamber 32 or 56. The aerosol particles 54 generated by the ultrasonic cavitation process experience an intrinsic electrostatic electrification which tends to produce a unipolar charge on the produced particles. This charge may be sufficient to cause the produced droplets 54 to resist the tendency to collide and coagulate but additional unipolar charging is applied to the droplets 54 and, as necessary, the same polarity of charge is applied to the dispersing gas, G, to avoid possible charge neutralization by the combination of oppositely charged particles. The process used to produce the additional electrostatic charging of the produced droplets 54 is provided by corona discharge electrodes 58 arranged in the form of inward-directed radial needles 111 surrounding the rising column of aerosol droplets 54. Similar corona discharge electrode rings (not shown) surrounding the dispersing gas exits may be used for the purpose of imparting a charge on the dispersing gas.

Generation Of Two Component Coated Aerosol Particles

Alternatively, (FIG. 5) where the organometallic liquid precursor 51 supplied to the ultrasonic cavitation reservoir 50 via supply duct 64 is a two-component immiscible liquid and ultrasonic excitation is turned off, component separation and horizontal stratification occurs within reservoir 50. Cavitation reservoir 50 contains a top layer 53 of perfluoroalkoxide overlaying a bottom layer 57 of alkoxide; the thickness of the top layer 53 being approximately 1 micrometer and bottom layer 57 approximately 2-3 micrometers for pure organometallics. The thicknesses of each layer can be achieved if the organometallic components are diluted with solvent, e.g., $C_3F_7OH$ heptafluoroisoproponal and $C_3H_7OH$ isoproponal for the top layer and bottom layer, respectively.

The immiscible liquids may, alternatively, be introduced onto the reservoir 50 through a central orifice (not shown in FIG. 5) and spread by surface tension or even by centrifugal force by spinning the reservoir bottom. Although layer separation depends on the surface energy difference, improved bilayer formation may be achieved through addition of small amounts of surfactants (approximately 0.1%) having a biphilic nature, e.g., $C_7F_9-OC_7H_9$.

After a stable planar bilayer 53 and 57 has formed, ultrasonic excitation is introduced by energizing the piezoceramic element 52 to produce cavitation in the bilayer 53 and 57 to generate an aerosol 55 (FIG. 5) having a size variation ±10 percent The aerosol 55 generated consists of microcapsules of $Zr(-OC_3H_7)_4$ coated by $Ta(-OC_3F_7)_5$ since the fluorofluid desires to minimize surface energy. For an excitation of 1-10 MHz, particles of 1-5 micrometers in size will be generated.

These stable concentric two-layer droplets 55 are then charged by the corona discharge ring 58 and needle electrodes 111 as described previously and then dispersed into the reaction chamber 56 by gas, G, or, alternatively, into a particle sorter and then a reaction chamber as will be hereinafter discussed.

Particle Sorting And Collection

For the intended purposes of this invention, the segregation of the aerosol particles 34, 54, or 55 by size is a critical requirement. Sorting of the chemically processed ceramic particles 34 or 54 according to their size as produced in the reaction chamber 32 (illustrated earlier in either FIG. 2 or 56 in FIG. 4) is necessary in order to gather small monosize particles for use in forming microparticle packings of green ceramic bodies which will later be sintered into finished ceramic material specimens and components. Similar sorting of liquid aerosol droplets 55 prior to chemical processing is necessary when the particles are of the two-component coated aerosol type (FIG. 5) since the particle sizing process must precede the staged chemical reactions which are designed to produce sinter-aid coatings on the finished ceramic microparticles.

In order to segregate the different forms of particles described above, they must be electrostatically charged and put in motion by the on-stream flow which moves them through the system. This motion must be supplemented by electrostatic acceleration forces acting on the charged particles. Electrostatic charging of the particles has already been discussed as a means of introducing repulsion forces between particles to minimize their coagulation and agglomeration. The charge on the particles for this purpose can also serve as a basis for sorting them according to their size provided that either: (1) all of the particles have the same magnitude and polarity of charge; or (2) all of the particles have the maximum amount of unipolar charge that can be retained in a stable state on their individual sizes without spontaneous self-corona discharge. The first of these conditions allows the particles to be sorted by conventional mass spectroscopy but is difficult to achieve because of changes in charge carried by the individual particles as they travel through the system and as they undergo chemical changes which introduce changes in the physical size of the particles. The second condition is more easily achieved by introducing a recharging process designed to saturate each particle with its maximum stable unipolar charge just prior to the particle sorting process. The second condition also offers the added advantages that the charged particles will maintain their highest interparticle repulsion forces and will be accelerated and deflected to the greatest degree by the intentionally applied electric or magnetic fields used in the sorting process.

Saturation corona charging of fine particles follows a general law expressed as $$Q_p = k_1 r^m \qquad (1)$$

where:
$Q_p$ = Maximum stable magnitude of charge on particle;
$k_1$ = Charge retention coefficient which is dependent upon the temperature of the particle, the positive or negative polarity of charge, the particle composition, and the particle shape (in MKS units);
r = Particle radius; and
m = Dimensionless exponent (typically in the range of $+1.0 \leq m \leq +2.0$) based upon the assumption of spherical particle shape.

The mass of the particle may be expressed as $$m_p = \frac{\rho m}{9.81} \left[ \frac{4\pi}{3} r^3 \right] \qquad (2)$$

$$= k_2 \rho_p r^3$$

where: $\rho_p$ = Average density of composite particle (in MKS units). Therefore, the charge-to-mass ratio of a charge-saturated particle is:

$$\frac{Q_p}{m_p} = \frac{k_1 r^m}{k_2 \rho_p r^3} \qquad (3)$$

$$= k_3 \left[ \frac{r^{m-3}}{\rho_p} \right]$$

where $k_3 = (k_2/k_2)$. This result indicates that the charge-to-mass ratio of a spherical particle is an inverse function of the particle radius.

Charged particles are accelerated by the electrostatic force exerted when the particle is in the presence of an electric field. For example, a negatively charged particle will be attracted toward a positively charged electrode and will travel in the direction of the associated electric field if it starts from rest or if its initial velocity is directed parallel to the electric field. The particle velocity increases because of the electrostatic attractive force $$F_e = Q_p \epsilon \qquad (4)$$

where:
$\epsilon = (E_2 - E_1)/d =$ Electric field intensity;
$E_1, E_2 =$ Potentials of separated equipotential surfaces which give rise to the electric field; and
$d =$ Distance separating the equipotential surfaces (electrostatic accelerator length).

Under conditions of positive acceleration, a charged particle entering an electric field parallel to the field direction at an intitial velocity of, $v_1$, emerges at a velocity, $v_2$, expressed by $$v_2 = \left[ v_1^2 + 2\frac{Q_p}{m_p}(E_2 - E_1) \right]^{\frac{1}{2}} \qquad (5)$$

which the potential difference, $(E_2 - E_1)$ is identified as the accelerating potential. For charge-saturated particles subjected to such electrostatic acceleration, the exit velocity, $v_{1p}$, is $$v_{2p} = \left[ v_{1p}^2 + k_4 \frac{r^{m-3}}{\rho_p}(E_2 - E_1) \right]^{\frac{1}{2}} \qquad (6)$$

where: $k_4 = 2k_3$. Therefore, if all of the particles entering the accelerator have essentially the same initial velocity, $v_{1p}$, and density, $\rho_p$, then the exit velocity, $v_{2p}$, is dependent only upon the particle radius, r. High-mobility particles, such as the ionized gas molecules mingled with the larger ceramic paritcles of interest all have very much higher charge-to-mass ratios and, by reference to Equation (5), will exhibit very much faster exit velocities.

For a properly designed accelerator, the exit velocity of the particles of interest will generally be much greater than the initial velocity and, hence, from Equation (6), $$v_{2p} \approx \left[ \frac{2Q_p}{m_p}(E_2 - E_1) \right]^{\frac{1}{2}} = \left[ k_4 \frac{r^{m-3}}{\rho_p}(E_2 - E_1) \right]^{\frac{1}{2}} \qquad (7)$$

When a charged particle travels in a direction normal to the direction of a uniform electric field, it is subjected to a force, $F_s = Q_p \epsilon_s$, and it is deflected along a parabolic trajectory. The specific defection of negatively charged particles is toward the positively charged electrode which produces the transverse field. At any position at which the particle velocity is $v_{2p}$, the deflection distance is expressed as $$\Delta s = k_5 \frac{Q_p}{m_p} \frac{V_s}{v_{2p}^2} d \qquad (8)$$

where:
$V_s =$ Potential difference between the electrodes causing the transverse field; and
$k_5 =$ Constant related to the bounding dimensions of the electric field zone through which the particle travels.

Thus, combining Equations (7) and (8), the transverse electrostatic deflection of the charged particles after traveling a distance, d, subject to a uniform transverse electric field is $$\Delta s = \frac{k_5}{2} \frac{V_s d}{(E_2 - E_1)} \qquad (9)$$

The charged particles discussed above are also deflected by a magnetic field oriented transverse to the direction of particle travel. In this case, the deflection force acting on the charged particle is $$F_m = B_s Q_p v_{2p} \qquad (10)$$

where: $B_s =$ Flux density of the applied magnetic field. For the same electrostatically accelerated particles having a velocity, $v_{2p}$, expressed approximately by Equation (7), the magnetic deflection distance is $$\Delta m = k_6 \left[ \frac{Q_p}{2m_p(E_2 - E_1)} \right]^{\frac{1}{2}} B_s d$$
$$= k_7 \left[ \frac{r^{m-3}}{\rho_p} \right]^{\frac{1}{2}} B_s d \qquad (11)$$

where: $k_6, k_7 =$ Geometrical constants.

In a uniform magentic field, the deflected particle trajectory is a circular path normal to the plane containing the initial direction of the particle motion when it entered the field at velocity, $v_{2p}$, and the direction of the magnetic flux density.

If a charged particle is simultaneously subjected to electrostatic and magnetostatic deflection forces, a special condition is obtained when these forces are equal and opposite; namely, all particles having a particular velocity will travel without deflection, regardless of their mass. Thus, equating the deflection forces on any charged particle, $$F_m = F_s = Q_p \epsilon_s = B_s Q_p v_{2p}$$

from which the velocity of the undeflected particles is $$v_{2p}^{(s)} = \frac{\epsilon_s}{B_s} \qquad (12)$$

where:
$\epsilon_s = (V_s/s) =$ Electric fields intensity of the deflecting electrostatic force; and
$s =$ Spacing of electrodes used to establish the deflecting electrostatic force.

Combining Equations (7) and (12), the charge-saturated particle size which is not deflected by the simultaneous electrostatic and magnetostatic forces has a radius expressed by $$r_s = k_8 \left[ \frac{\rho_p}{E_2 - E_1} \left( \frac{\epsilon_s}{B_s} \right)^2 \right]^{1/m-3} \qquad (13)$$

where: $k_8 =$ Geometrical constant.

Equation (13) indicates, for example, that the electrostatic deflection potential may be adjusted so that the sorting process will select as undeflected those particles having a radius, $r_s$, with a sensitivity expressed by $$v_2 = k_9 (\epsilon_s)^{2/m-3} \tag{14}$$

where: $k_9$ = Geometrical constant.

Therefore, by designing the undeflected particle trajectory path to pass through a narrow aperture at the exit end of the charged particle sorting apparatus, only those particles having a radius, $r_s$, will be passed. This particle size is defined as the sorted particle size, whereas all other sizes of particles will be blocked by the aperture plate and removed from the system.

Processed Ceramic Particle Sorting

Figure 6:
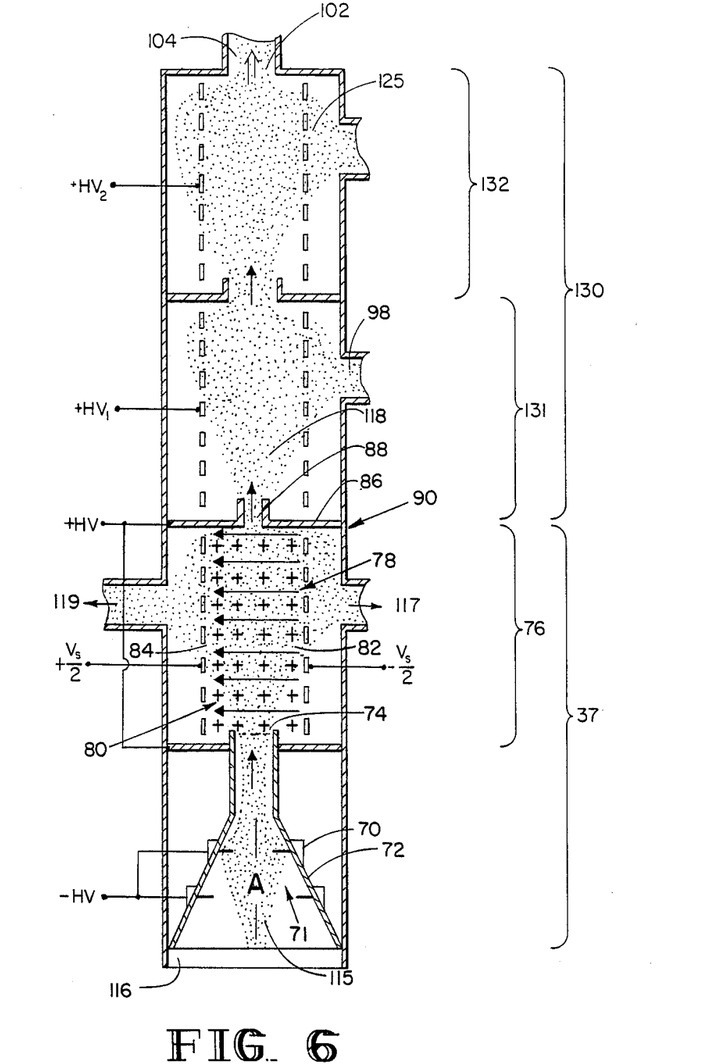
FIG. 6 is a diagrammatic verticle sectional view of the particle acceleration sorting and collection stages of an apparatus constructed in accordance with the present invention.

FIG. 6 shows the general arrangement of such a particle sorting apparatus 37. Sorting of the preferred monosize ceramic particles 125 is accomplished by, first, applying the maximum sustainable charge to the processed particles 115 received from the reaction chamber 116. For example, corona discharge electrodes 70 impart a unipolar negative charge to the particles 115 as they move into a constricting flow channel 72 which increases their velocity. The particles 115 are electrostatically accelerated through high voltage aperture 74 and enter the particle velocity sorting zone 76. There is no axial electrostatic field present in the velocity sorting zone 76; only a uniform electric field, ($V_s$/s), 78 and a uniform magnetic field, $B_s$, 80 oriented so as to impart off-axis deflection forces. For specific magnitudes of the electric 78 and magnetic fields 80, only those particles having a particular velocity experience equal and opposite deflection forces and, hence, are not deflected away from the central axis A of particle motion and flow through the particle sorting zone 76. Furthermore, since the particles 115 were charge saturated when they entered the sorting zone 76, their sizes and velocities are closely related. Therefore, selectively sorting the particles 115 according to a particular velocity is equivalent to selectively sorting the particles according to a particular size. Particles not traveling at the selected velocity are deflected (faster particles 82 experience a greater magnetic deflecting force which moves them off axis to the right and slower particles 84 experience a greater electrostatic deflection force which moves them off axis to the left in FIG. 6) and these deflected particles are recovered as velocity-rejected particles 117 and 119, respectively. A plate 86 containing a small aperture 88 is located at the upper end 90 of the particle velocity sorting zone 76. The aperture opening 88 in plate 86 is designed to pass only those particles 118 having a very narrow range of velocities governed by the balanced deflection forces. Correspondingly, the particles 118 satisfying this velocity sorting process will have a very narrow range of sizes because of their charge-saturated state on entering the sorting zone 76.

Monosize Particle Collection

The small aperture 88 at the upper end 90 of the velocity sorting zone 76 allows the selectively undeflected particles 118 to pass into two-stage electrostatic precipitator 130 which further segregates the particles 118 according to their charge-to-mass ratios and, hence, according to their drift mobility and size under the influence of the applied electrostatic fields $+HV_1$ and $+HV_2$ in the precipitator stages. The first stage 131 is intended to collect and remove ionized molecules and other very small high-mobility particles 98 that pass the velocity sorting process. The second stage 132 is intended to collect and remove the monosize ceramic particles 125 of interest having a size variation of $\pm 1.0$ percent, thereby comprising the output product of the on-stream particle production process. Neutral particles 102 are not captured by the precipitators 131 and 132 and are recovered separately at the upper flow outlet 104 of the system. To aid the electrostatic precipitation process, a supplemental negative corona charging stage (not shown) similar to that shown in FIG. 6 ahead of the electrostatic accelerator 74 and velocity sorting stage 76 may be incorporated above the aperture plate 86. This supplemental charging stage would replenish any charge lost by the particles because of collisions with other particles and would minimize the number of neutral particles entering the electrostatic precipitation collectors.

Aerosol Droplet Sorting

Figure 7:
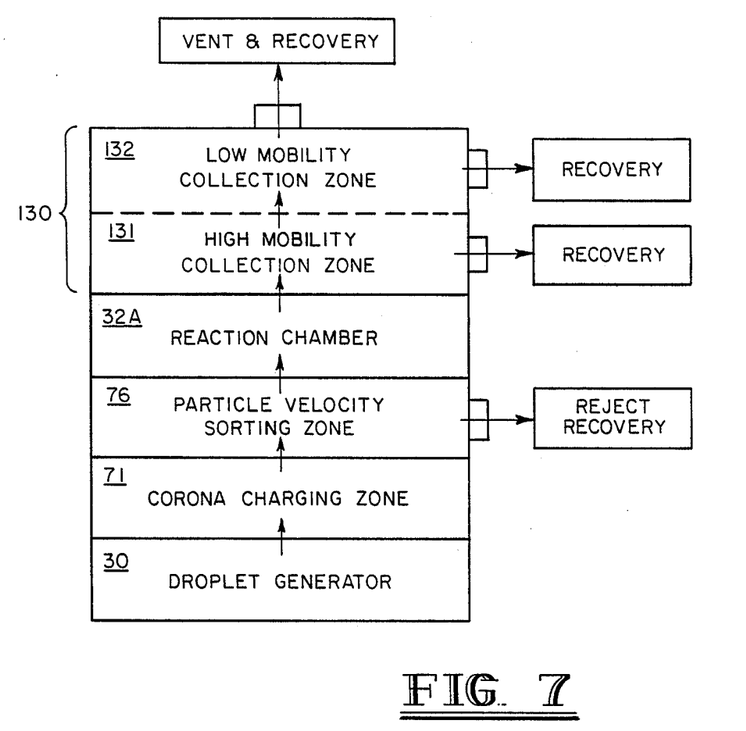
FIG. 7 is a schematic block diagram of an alternative flow path of the present invention.

The selective particle size sorting technique described above for processed ceramic particles 115 may be adapted and applied to the organometallic liquid precursor droplets 34 or 54 before they enter the reaction chamber 32A or otherwise become subjected to particle chemical reactions and collection. FIG. 7 illustrates such an arrangement. For this purpose, the corona charging zone 71 shown in FIG. 6 must be located immediately above the aerosol generator 30 or 31 illustrated in either FIG. 2 or FIG. 4 so that the liquid droplets become charge saturated according to their size. These charged particles 34 or 54 are then electrostatically accelerated in the constricted aerosol flow channel 72 and enter the particle velocity sorting zone 76 as previously shown and described in FIG. 6. The particle velocity and related size selectivity effects of the electric 78 and magnetic 80 fields applied in the particle velocity sorting process are the same for the charged precursor liquid droplets 34 or 54 as described previously for the solid processed ceramic particles 115. Evaporation of the liquid components of the droplets is assumed to have a negligible effect on the magnitude of the charge carried by each particle as will be the case when low-volatility liquids are involved.

The selected size of the organometallic droplets then pass through the aperture plate 86 of the particle velocity sorting stage 76 shown in FIG. 6 where they have predominantly the same size and are ready to be chemically reacted, typically by hydrolysis via exposure to a moist inert gas atmosphere while in aerosol suspension. Thus, a chemical reaction chamber 32A must be incorporated between the aperture plate 86 and the first electrostatic precipitator collector 131 shown in FIG. 6 for the purpose of processing the droplets into finished monosize ceramic particles. The placement of the reaction chamber 32A after the sorting zone 76 is shown schematically in FIG. 7. The electrostatic precipitator particle collectors 131 and 132 shown in FIG. 6 are located after this reaction chamber 32A so as to collect and remove the output ceramic particles 125 of interest, having a size variation of $\pm 1.0$ percent, from the on-stream particle production process. Such preferential size selection of the organometallic liquid droplets is a necessary step in preparing to chemically process sinter-aid-coated droplets to yield monosize ceramic solid precipitate particles in the reaction chamber.

Figure 8:
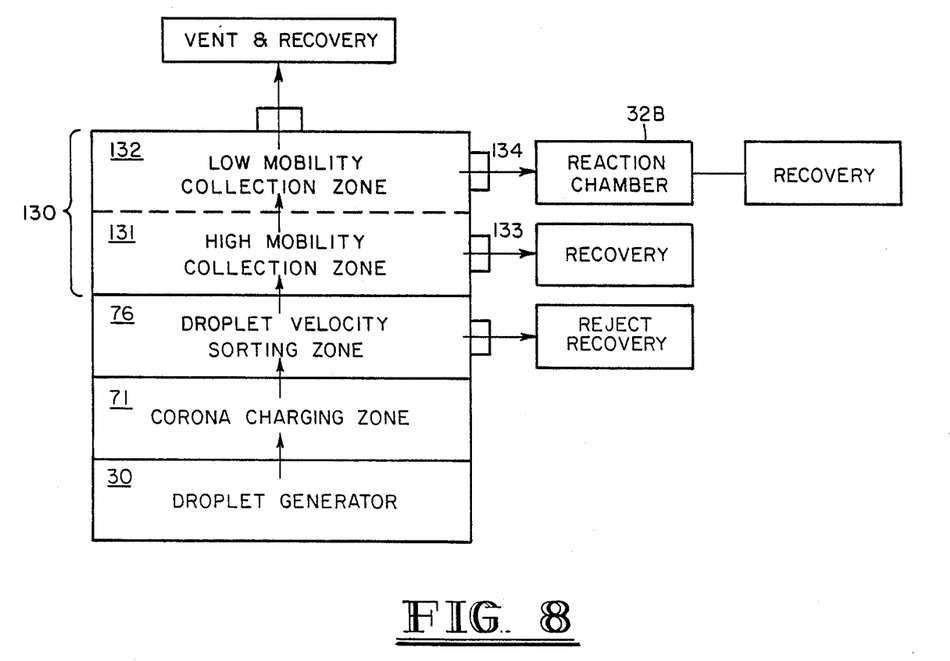
FIG. 8 is a schematic block diagram of a flow path for processing multilayered particles in accordance with the present invention.

Concentric Coated Droplet Processing

Where the organometallic liquid droplets are concentric bilayer droplets 55 as previously discussed (see FIG. 5), the placement of a reaction chamber or medium 32B after the droplet sorting zone 76 is further modified. Rather than react the concentric droplets 55 immediately after the sorting zone 76, the droplets are collected as high and low mobility droplets 133 and 134 in the collection phase 130. FIG. 8 is a schematic illustration of this alternative.

The monosize organometallic precursor particles 134 collected and having a size variation of ±1.0 percent are next directed into a rapidly stirred liquid suspension medium 32B of an appropriate ionic strength. Upon entering the saturated water atmosphere above the liquid medium 32B the heptafluoroalkoxide and alkoxide droplet 134 will react to oxide by hydrolysis within the reaction time of a few milliseconds. For example, in the outer coating component of the liquid droplets, the reaction is $$Ta(-OC_3F_7)_5 + 5H_2O \longrightarrow Ta(OH)_5 + 5C_3F_7OH$$
$$\downarrow \text{hydroxyl condensation}$$
$$\frac{1}{2}Ta_2O_5 + 5/2\ H_2O$$

The above noted condensation reaction also occurs within the inner encapsulated component of the droplets to form $ZrO_2$. The reaction is sufficiently rapid to avoid dispersal of the oxide phases into each other. However, a good bond between the inner and outer phases is assured by hydroxide condensation at the interphase boundary.

The concentric liquid particle components provides a particle geometry by which the outer layer may be also doped with alkoxides of different valences, e.g., $(Zn(-OCH_3)_2, Ca(OCH_3)_2, Ti(OCH_3)_3)$ so that a controlled surface charge is produced upon incorporation of the particles into the suspension medium. In such a way, the isoelectric point of the particle is controlled within narrow limits. This is essential to forming uniform surface charges in solution. Only under such conditions can the desired ordered colloidal sols be formed.

More complicated concentric three component particles may be produced by allowing the microencapsulated droplets to enter a saturated atmosphere or stream of another organometallic vapor. The third organometallic vapor nucleates and grows on the preformed particles at a rate dependent on the residence time in the atmosphere of the third organometallic vapor. These three component particles would then be quenched as previously indicated into the suspension medium 32B.

While the invention has been described in connection with the preferred embodiment, it is not intended to limit the invention to the particular forms set forth, but, on the contrary, it is intended to cover alternatives, modifications, and equivalents as may be included within the spirit and scope of the invention as defined by the appended claims.

We claim:

1. A method for producing two-layer ceramic particles comprising the steps of:
   a. directing an immiscible combination of an organometallic liquid and surface coating liquid to an aerosol particle generator;
   b. separating at said generator said organometallic liquid to a top layer and said surface coating liquid to a bottom layer;
   c. mechanically exciting said layers whereby said organometallic liquid mixes with said surface coating liquid said mechanical excitation generating and releasing simultaneously into a space from a single discharge opening a multiplicity of two-layered microparticles thereby forming a stream of said two-layered microparticles in said space;
   d. electrostatically charging said two-layered microparticles to induce particle repulsion;
   e. separating from said charged microparticles, microparticles having substantially equal size; and
   f. oxidizing said substantially equal size microparticles.

* * * * *